(12) United States Patent
Elmose et al.

(10) Patent No.: US 10,989,174 B2
(45) Date of Patent: Apr. 27, 2021

(54) BEARING ARRANGEMENT AND A WIND TURBINE

(71) Applicant: SIEMENS GAMESA RENEWABLE ENERGY A/S, Brande (DK)

(72) Inventors: Soeren Forbech Elmose, Bording (DK); Björn Pedersen, Ansager (DK)

(73) Assignee: SIEMENS GAMESA RENEWABLE ENERGY A/S, Brande (DK)

( * ) Notice: Subject to any disclaimer, the term of this patent is extended or adjusted under 35 U.S.C. 154(b) by 113 days.

(21) Appl. No.: 16/244,278

(22) Filed: Jan. 10, 2019

(65) Prior Publication Data
US 2019/0219036 A1 Jul. 18, 2019

(30) Foreign Application Priority Data
Jan. 18, 2018 (EP) .................................... 18152225

(51) Int. Cl.
*F03D 80/70* (2016.01)
*F03D 17/00* (2016.01)
(Continued)

(52) U.S. Cl.
CPC ............ *F03D 80/70* (2016.05); *F03D 17/00* (2016.05); *F16C 17/02* (2013.01); *F16C 17/246* (2013.01); *F16C 33/26* (2013.01); *F16C 41/00* (2013.01); *F16C 43/02* (2013.01); *G01B 17/02* (2013.01); *G01M 13/045* (2013.01); *F05B 2240/50* (2013.01); *F05B 2260/80* (2013.01); *F05B 2270/333* (2013.01); *F16C 17/04* (2013.01); *F16C 2233/00* (2013.01); *F16C 2300/14* (2013.01); *F16C 2360/31* (2013.01)

(58) Field of Classification Search
CPC ..................................................... F16C 17/246
See application file for complete search history.

(56) References Cited

U.S. PATENT DOCUMENTS 9,188,107 B2 * 11/2015 Minadeo ................. F16C 33/60
2010/0119370 A1 5/2010 Myhr

FOREIGN PATENT DOCUMENTS

DE 102005053335 A1 5/2007
EP 2511521 A1 10/2012
(Continued)

OTHER PUBLICATIONS

European Search Report for application No. 18152225.1 dated Aug. 2, 2018.
(Continued)

*Primary Examiner* — Juan G Flores
(74) *Attorney, Agent, or Firm* — Schmeiser, Olsen & Watts LLP

(57) ABSTRACT

Provided is a bearing arrangement for a wind turbine, including a first portion, a second portion, and a sound wave sensor which is configured to detect a thickness of the second portion, wherein one of the first portion and the second portion is movable relative to the other of the first portion and the second portion. In contrast to known bearing arrangements for wind turbines, the thickness of the second portion which for example is exposed to wear may be actively detected. Thus, the information of the thickness is available at any time. Thus, a demand of an exchange of the second portion can be precisely predicted and determined.

12 Claims, 4 Drawing Sheets

(51) Int. Cl.
    *G01M 13/045*     (2019.01)
    *F16C 43/02*     (2006.01)
    *F16C 41/00*     (2006.01)
    *F16C 17/24*     (2006.01)
    *G01B 17/02*     (2006.01)
    *F16C 33/26*     (2006.01)
    *F16C 17/02*     (2006.01)
    *F16C 17/04*     (2006.01)

(56) References Cited

FOREIGN PATENT DOCUMENTS

| | | | | |
|---|---|---|---|---|
| EP | 2933480 A1 | 10/2015 | | |
| EP | 3135928 A1 | 3/2017 | | |
| JP | H-0534135 | * 2/1993 | | |
| JP | H0534135 A | 2/1993 | | |
| WO | 2013057273 A1 | 4/2013 | | |
| WO | WO-2013057273 A1 * | 4/2013 | ........... | G01L 5/0009 |
| WO | WO 2013057273 A1 | 4/2013 | | |

OTHER PUBLICATIONS

Office Action in related Chinese Patent Application No. 201910040267.6 dated Dec. 16, 2020. 6 pages.

* cited by examiner

BEARING ARRANGEMENT AND A WIND TURBINE

CROSS-REFERENCE TO RELATED APPLICATIONS

This application claims priority to European Application No. 18152225.1, having a filing date of Jan. 18, 2018 the entire contents of which are hereby incorporated by reference.

FIELD OF TECHNOLOGY

The following relates to a bearing arrangement for a wind turbine and to a wind turbine.

BACKGROUND

Modern wind turbine rotor blades are built from fiber-reinforced plastics. A rotor blade typically comprises an airfoil having a rounded leading edge and a sharp trailing edge. The rotor blade is connected with its blade root to a hub of the wind turbine. Further, the rotor blade is connected to the hub by means of a pitch bearing that allows a pitch movement of the rotor blade relative to the hub. Such pitch bearings are often provided as sliding or friction bearings. Removal of material as a consequence of wear may be an important design parameter. If the wear rate exceeds the reserve it may result in failure of the pitch bearing.

SUMMARY

An aspect relates to an improved bearing arrangement.

Accordingly, a bearing arrangement for a wind turbine is provided. The bearing arrangement comprises a first portion, a second portion, and a sound wave sensor which is configured to detect a thickness of the second portion, wherein one of the first portion and the second portion is movable relative to the other of the first portion and the second portion.

In contrast to known bearing arrangements for wind turbines, the thickness of the second portion which for example is exposed to wear may be actively detected. Thus, the information of the thickness is available at any time. Hence, a demand of an exchange of the second portion can be precisely predicted and determined. This has the advantage that needless maintenance can be avoided. Moreover, resources may be economized.

Preferably, the first portion comprises a sliding surface and the second portion comprises a sliding surface which faces the sliding surface of the first portion. In particular, the sliding surface of the second portion is configured to slide, e.g. by means of an oil film, against the sliding surface of the first portion. Preferably, the first portion is ring-shaped. In particular, the sliding surface of the first portion is ring-shaped. Preferably, the sliding surface of the second portion is ring segment-shaped. In particular, the bearing arrangement is a mixed friction bearing or plane bearing.

"Detecting a thickness" may also mean that the thickness is measured. Preferably, the sound wave sensor comprises a sound wave emitter which is configured to emit sound waves and a sound wave receiver configured to receive reflected sound waves. In particular, the sound waves may be named sound. Preferably, reflected sound waves may be named echo. In particular, the sound waves are provided as ultrasonics or supersonics. Preferably, the sound wave sensor is an ultrasonic sensor.

According to an embodiment, the sound wave sensor is configured to detect the thickness of the second portion through the first portion.

This has the advantage that the first portion may be placed between the sound wave sensor and the second portion. In particular, "through" may mean "throughout". Preferably, the sound wave sensor is located at an outer surface of the first portion which is averted from the sliding surface of the first portion, wherein the sound waves emitted by the sound wave sensor propagate from the outer surface towards the sliding surface of the first portion.

According to a further embodiment, the sound wave sensor is rigidly connected to the first portion.

Thus, the sound waves may be induced directly into the first portion.

According to a further embodiment, the sound wave sensor is glued to the first portion.

Thus, a reliable connection may be provided.

According to a further embodiment, the first portion comprises steel material.

Preferably, the first portion is a bearing ring or a part thereof. The outer surface of the first portion may be located at an outer or outermost diameter of the first portion. Alternatively, the outer surface of the first portion may be located at an inner or innermost diameter of the first portion.

According to a further embodiment, the sound wave sensor is configured to detect the thickness of the second portion during a movement of one of the first portion and the second portion relative to the other of the first portion and the second portion.

This has the advantage that a gradient of the thickness of the second portion may be detected.

According to a further embodiment, the second portion is a sliding pad.

Preferably, the sliding pad is a replaceable portion of the bearing arrangement which may be replaced during maintenance of the bearing arrangement.

According to a further embodiment, the bearing arrangement further comprises a plurality of sliding pads arranged circularly around the first portion, wherein the plurality of sliding pads is configured to rotate around the first portion.

In particular, the second portion is comprised by the plurality of sliding pads. Preferably, the sliding pads are connected to each other. In particular, each of the sliding pads is configured to be disconnected separately from the other sliding pads. Preferably, 15 to 35, more preferably 20 to 30, sliding pads are provided.

According to a further embodiment, the sound wave sensor is configured to detect thicknesses of at least two sliding pads.

Preferably, the sliding pad is one of the at least two sliding pads. This has the advantage that only one sound wave sensor or a few sound wave sensors may be provided and may be configured to detect thicknesses of all sliding pads of the bearing arrangement.

According to a further embodiment, the bearing arrangement further comprises a further sound wave sensor which is con-figured to detect a further thickness of the second portion.

Preferably, three sound wave sensors are provided which are configured to detect three thicknesses of the first portion. Alternatively, the three sound wave sensors are configured to detect thicknesses of different sliding pads.

According to a further embodiment, the bearing arrangement further comprises a lubricating film which is arranged between the first portion and the second portion, and which is configured to lubricate a movement between the first and the second portion.

To "lubricate a movement" means that a friction coefficient between sliding surfaces is reduced. Preferably, the lubricating film is an oil film.

According to a further embodiment, the sound wave sensor is configured to detect the thickness of the second portion through the lubricating film.

This, has the advantage that a convenient position of the sound wave sensor may be selected.

Further, a wind turbine comprising such a bearing arrangement is provided.

"Wind turbine" presently refers to an apparatus converting the wind's kinetic energy into rotational energy, which may again be converted into electrical energy by the apparatus.

In particular, the wind turbine or the bearing arrangement comprises a computer device for computing the thickness of the second portion from the received reflected sound waves.

According to an embodiment, the wind turbine comprises a hub and a blade which is rotatably connected to the hub by means of the bearing arrangement.

Preferably, the wind turbine comprises three blades each connected to the hub by means of such a bearing arrangement.

According to a further embodiment, the first portion is fixedly connected to one of the hub and the blade and the second portion is fixedly connected to the other of the hub and the blade.

The embodiments and features described with reference to the bearing arrangement of the present embodiments of the invention apply mutatis mutandis to the wind turbine of the present embodiments of the invention.

Further possible implementations or alternative solutions of the embodiments of the invention also encompass combinations—that are not explicitly mentioned herein—of features described above or below with regard to the embodiments. The person skilled in the art may also add individual or isolated aspects and features to the most basic form of the embodiments of the invention.

BRIEF DESCRIPTION

Some of the embodiments will be described in detail, with reference to the following figures, wherein like designations denote like members, wherein.

DETAILED DESCRIPTION

Figure 1:
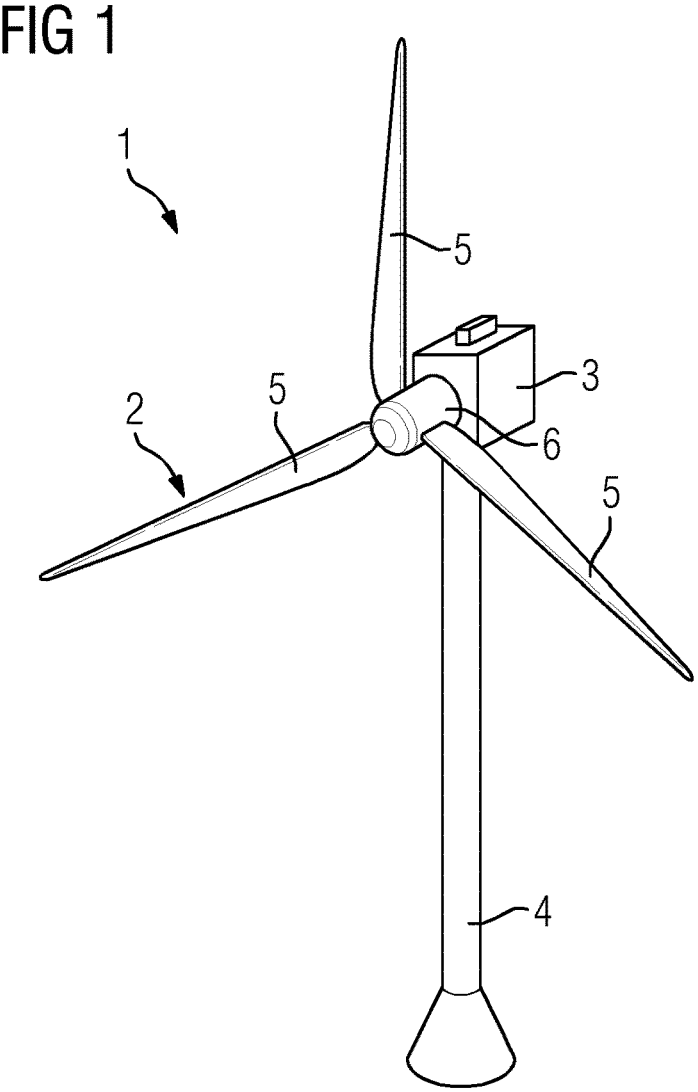
FIG. 1 shows a perspective view of a wind turbine according to one embodiment.

In the Figures, like reference numerals designate like or functionally equivalent elements, unless otherwise indicated.

FIG. 1 shows a wind turbine 1. The wind turbine 1 comprises a rotor 2 connected to a generator (not shown) arranged inside a nacelle 3. The nacelle 3 is arranged at the upper end of a tower 4 of the wind turbine 1.

The rotor 2 comprises three wind turbine blades 5. The wind turbine blades 5 are connected to a hub 6 of the wind turbine 1. Moreover, the blades 5 are connected to the hub 6 by means of a bearing arrangement 10 (see FIG. 3). The bearing arrangement 10 is configured to bear the blade 5 such that a rotational movement between the blade 5 and the hub 6 may occur. In particular, this rotational movement may be named pitch. Preferably, the bearing arrangement 10 is a pitch bearing or blade bearing. Preferably, the bearing arrangement 10 is a radial or plain bearing. Alternatively, the bearing arrangement 10 may be provided as a thrust or axial bearing. In particular, all blades 5 of the wind turbine 1 are connected to the hub 6 by means of such a bearing arrangement 10.

Rotors 2 of this kind may have diameters ranging from, for example, 30 to 200 meters or even more. The wind turbine blades 5 are subjected to high wind loads. At the same time, the wind turbine blades 5 need to be lightweight. For these reasons, wind turbine blades 5 in modern wind turbines 1 are manufactured from fiber-reinforced composite materials. Therein, glass fibers are generally preferred over carbon fibers for cost reasons. Oftentimes, glass fibers in the form of unidirectional fiber mats are used.

Figure 2:
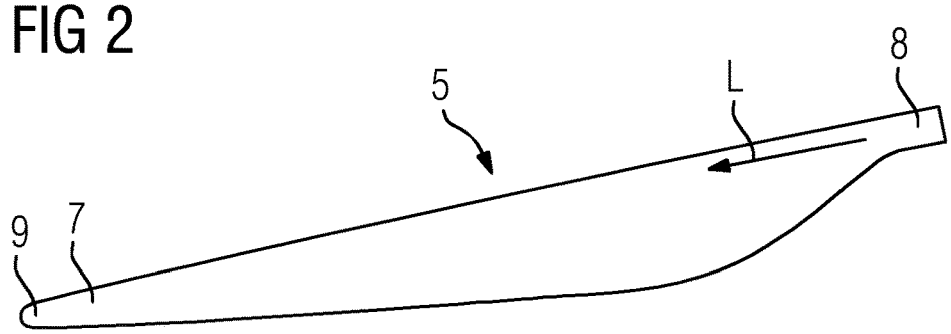
FIG. 2 shows a perspective view of a wind turbine blade of the wind turbine according to FIG. 1.

FIG. 2 shows a wind turbine blade 5. The wind turbine blade 5 comprises an aerodynamically designed portion 7 which is shaped for optimum exploitation of the wind energy and a blade root 8 for connecting the wind turbine blade 5 to the hub 6. Further, the wind turbine blade 5 comprises a blade tip 9 which is arranged averted from the blade root 8. The wind turbine blade 5 extends in a longitudinal direction L. The bearing arrangement 10 (see FIG. 1) allows a rotational movement of the blade 5 around the longitudinal direction L relative to the hub 6 (see FIG. 1).

Figure 3:
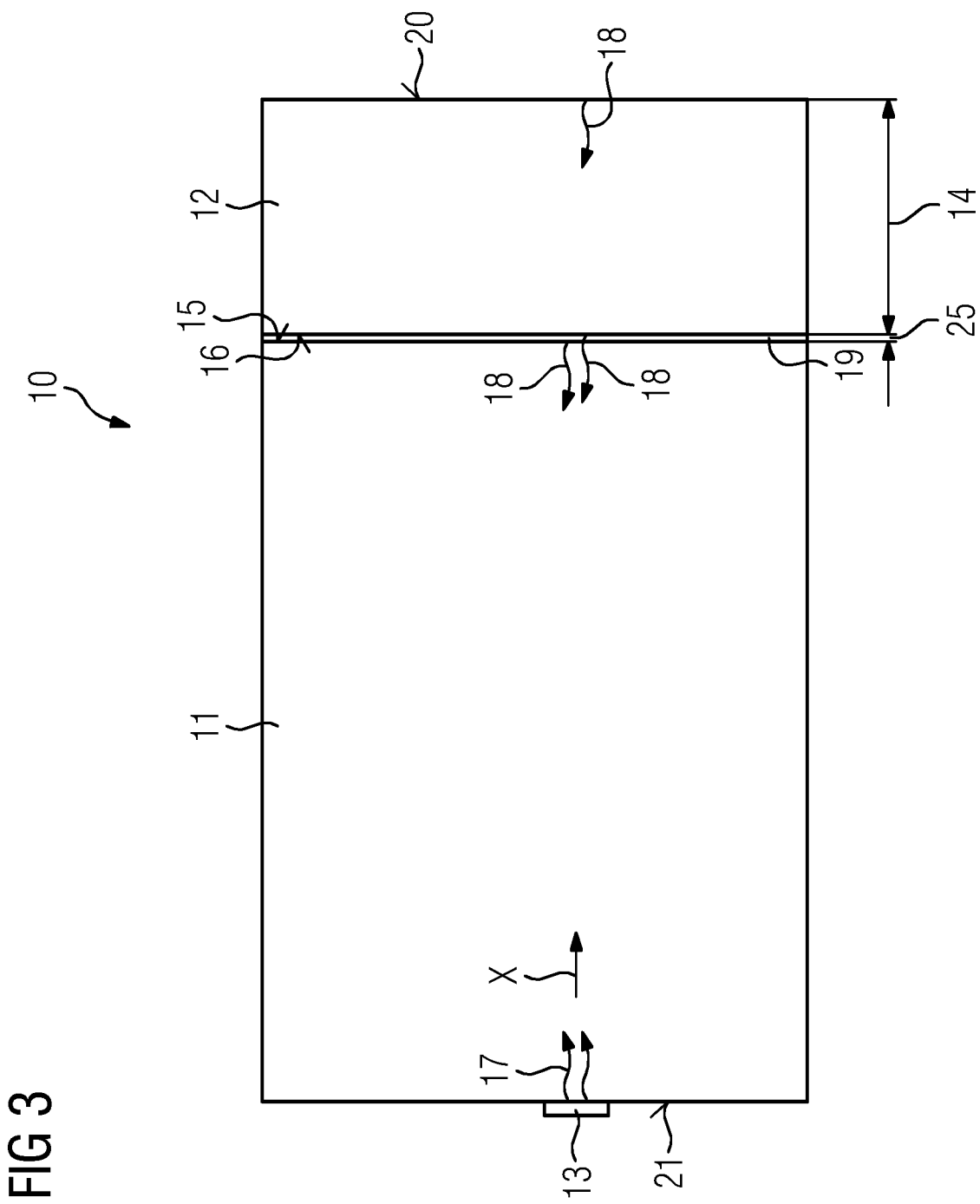
FIG. 3 shows a partial schematic view of one embodiment of a bearing arrangement of the wind turbine according to FIG. 1.

FIG. 3 shows a partial schematic view of the bearing arrangement 10. The bearing arrangement 10 comprises a first portion 11, a second portion 12, and a sound wave sensor 13 which is configured to detect a thickness 14 of the second portion 12. One of the first portion 11 and the second portion 12 is movable relative to the other of the first portion 11 and the second portion 12.

The first portion 11 is fixedly connected to one of the hub 6 (see FIG. 1) and the blade 5 (see FIG. 1) and the second portion 12 is fixedly connected to the other of the hub 6 and the blade 5. Preferably, the second portion 12 is a sliding pad.

In particular, the bearing arrangement 10 comprises a plurality of sliding pads arranged circularly around the first portion 11, wherein the plurality of sliding pads is configured to rotate around the first portion 11. In particular, the plurality of sliding pads forms a bearing ring (not shown). Preferably, the first portion 11 is ring-shaped. In particular, the first portion 11 comprises a steel material or is completely made of steel material. Preferably, the second portion 12 comprises a steel material or is completely made of steel material.

The first portion 11 comprises a sliding surface 15 and the second portion 12 comprises a sliding surface 16 which faces the sliding surface 15 of the first portion 11. In particular, the sliding surface 16 of the second portion 12 is configured to slide, e.g. by means of a lubricating film 19, against the sliding surface 15 of the first portion 11. In particular, the sliding surface 15 of the first portion 11 is ring-shaped. Preferably, the sliding surface 16 of the second portion 12 is ring segment-shaped.

The sound wave sensor 13 is configured to detect the thickness 14 of the second portion 12 through the first portion 11.

Preferably, the sound wave sensor 13 comprises a sound wave emitter (not shown) which is configured to emit sound waves 17 and a sound wave receiver (not shown) configured to receive reflected sound waves 18. The sound wave sensor 13 comprises an emitting direction X for emitting the sound waves 17 towards the second portion 12. Preferably, the sound waves 17 firstly propagate through the first portion 11. Further, reflection at the surface 15 may occur. Due to a reflection coefficient some of the sound waves 17 are reflected back to the sound wave sensor 13 and some of the sound waves 17 propagate into the lubricating film 19. The same occurs analogously when the sound waves 17 meet the surface 16 of the second portion 12, and again when the sound waves 17 hit a back surface 20 of the second portion 12 which is averted from the surfaces 15, 16.

Preferably, reflected sound waves 18 may be named echo. In particular, the sound waves 17 are provided as ultrasonics or supersonics. Preferably, the sound wave sensor 13 is an ultrasonic sensor. In particular, the sound wave sensor 13 is rigidly connected to the first portion 11. Preferably, the sound wave sensor 13 is located at an outer surface 21 of the first portion 11 which is averted from the surfaces 15, 16, wherein the sound waves 17 emitted by the sound wave sensor 13 propagate from the outer surface 21 towards the sliding surface 15 of the first portion 11. Preferably, the sound wave sensor 13 is glued to the first portion 11.

The lubricating film 19 is arranged between the first portion 11 and the second portion 12 and is configured to lubricate a movement between the first portion 11 and the second portion 12. Preferably, the lubricating film 19 is an oil film. In particular, the sound wave sensor 13 is configured to detect the thickness 14 of the second portion 12 through the lubricating film 19.

Preferably, the sound wave sensor 13 is configured to detect the thickness 14 of the second portion 12 during a movement of one of the first portion 11 and the second portion 12 relative to the other of the first portion 11 and the second portion 12. For example, a gradient of the thickness 14 of the second portion 12 may be detected.

In particular, the sound wave sensor 13 is configured to detect, e.g. sequentially, thicknesses 14 of at least two sliding pads. For example, this may be executed if the sound wave sensor 13 detects thicknesses 14 at different pitch positions of the blade 5 (see FIG. 1). In particular, by a use of measuring or detecting gates it is possible to measure or detect the thickness 14 when the sliding pad slides by the sound wave sensor 13. In this way it is possible to measure or detect several thicknesses of sliding pads by means of one sound wave sensor 13.

Figure 4:
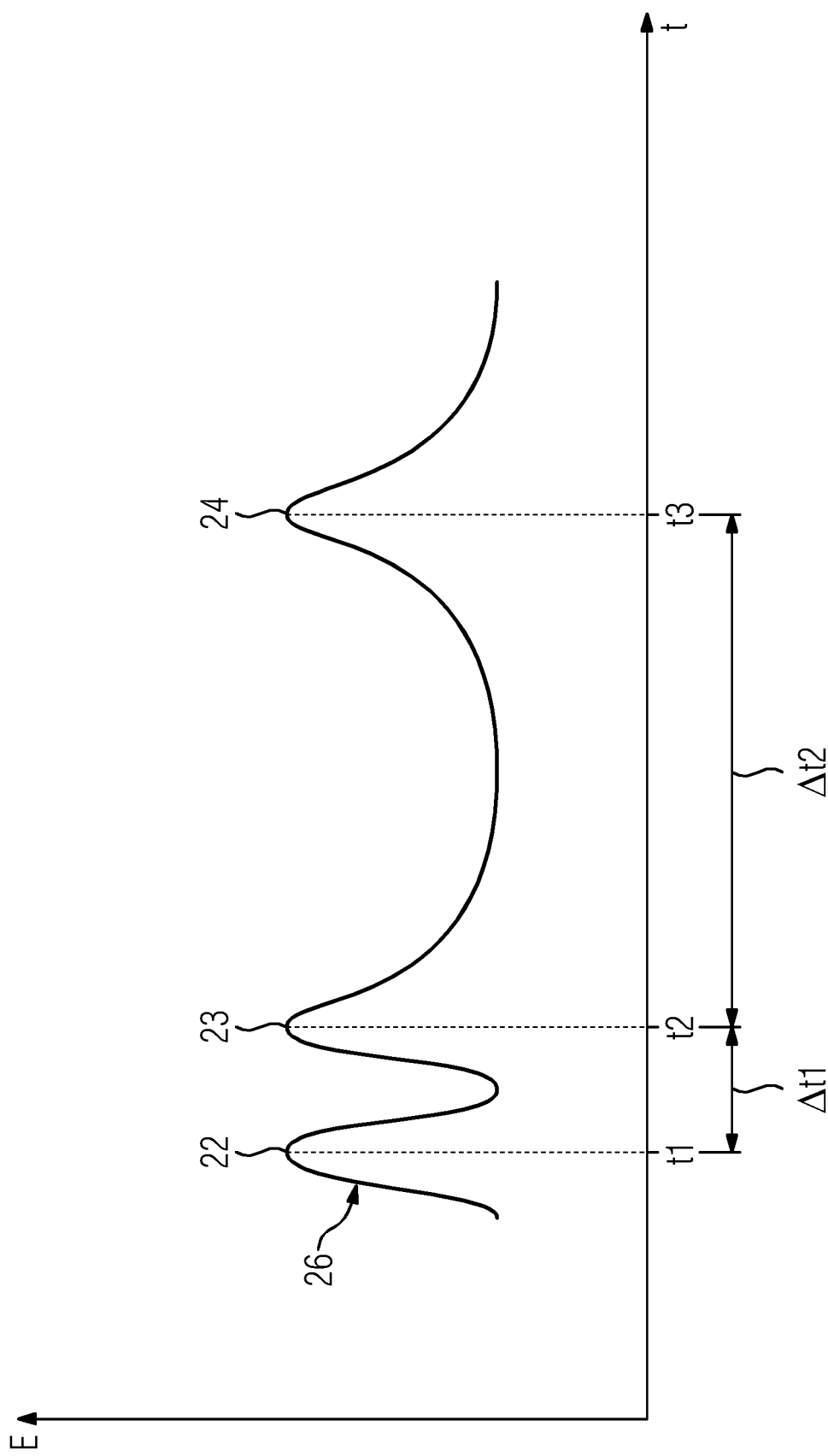
FIG. 4 shows a schematic echo-time diagram of a sound wave sensor of the bearing arrangement according to FIG. 3.

FIG. 4 shows a schematic echo-time diagram of the sound wave sensor 13 of the bearing arrangement 10. The echo-time diagram comprises an echo-curve 26 symbolizing reflected sound waves 18 (see FIG. 3), indicated by E, received by the sound wave sensor 13 over a time t. A first echo-peak 22 at a time t1 results from a reflection of sound waves 17 at the surface 15 of the first portion 11. A second echo-peak 23 at a time t2 results from a reflection of sound waves 17 at the surface 16 of the second portion 12. A third echo-peak 24 at a time t3 results from a reflection of sound waves 17 at the back surface 20 of the second portion 12. By means of a first time difference $\Delta t1$ between the first and the second time t1, t2 a thickness 25 (see FIG. 3) of the lubricating film 19 may be calculated. Moreover, by means of a second time difference $\Delta t2$ between the second and the third time t2, t3 (and e.g. a known wave velocity) the thickness 14 (see FIG. 3) of the second portion 12 may be calculated.

Preferably, the sound wave sensor 13 is configured to detect the thickness 25 of the lubrication film 19.

Figure 5:
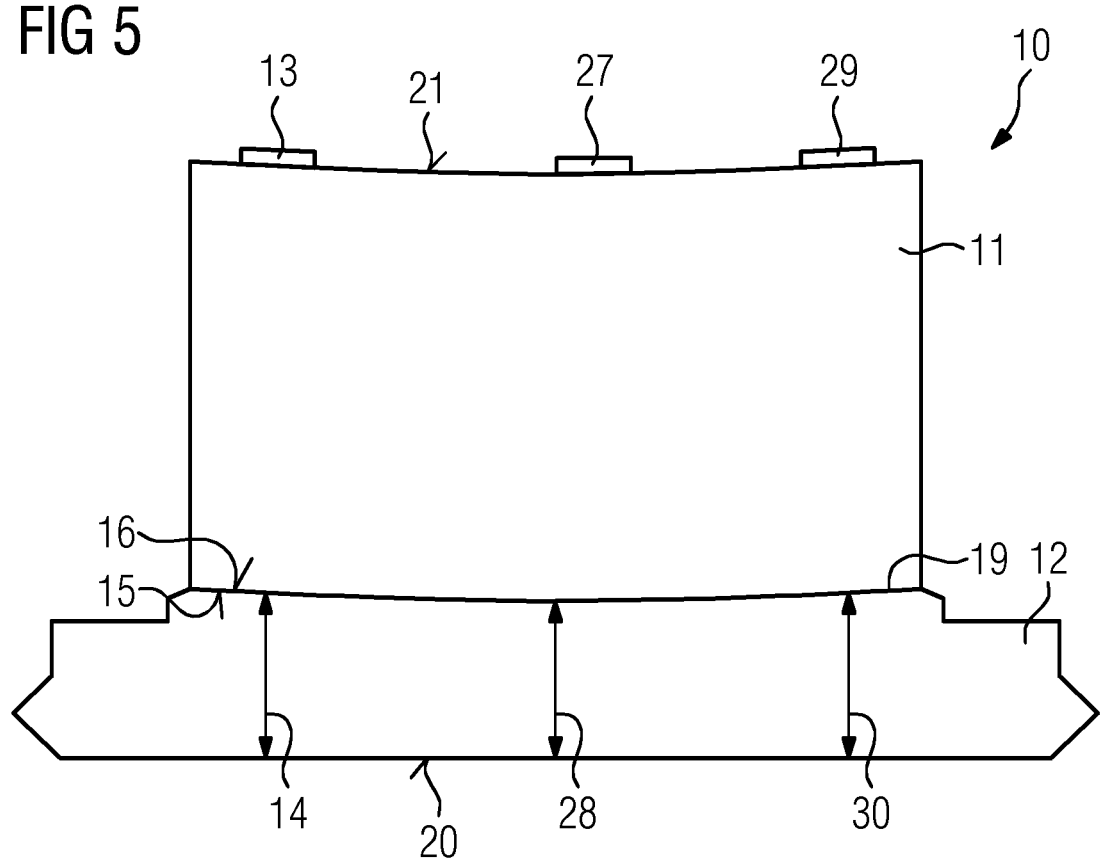
FIG. 5 shows a partial schematic view of a further embodiment of a bearing arrangement of the wind turbine according to FIG. 1.

FIG. 5 shows a partial schematic view of a further embodiment of the bearing arrangement 10 of the wind turbine 1. The bearing arrangement 10 comprises a further sound wave sensor 27 (also indicated as second sound wave sensor) which is configured to detect a further thickness 28 (also indicated as second thickness) of the second portion 12, e.g. simultaneously with a detection of the thickness 14 (also indicated as first thickness) by means of the sound wave sensor 13 (also indicated as first sound wave sensor).

Preferably, the bearing arrangement 10 comprises a third sound wave sensor 29 which is configured to detect a third thickness 30 of the second portion 12, e.g. simultaneously with a detection of the thicknesses 14, 28 by means of the sound wave sensors 13, 27. Hence it is possible to detect a reliable and consistent thickness 14, 28, 30 of the second portion 12 which is e.g. merely one sliding pad of the bearing arrangement 10.

It is understood that features explained with regard to the sound wave sensor 13 e.g. apply mutatis mutandis to the sound wave sensors 27, 29.

Although the present invention has been disclosed in the form of preferred embodiments and variations thereon, it will be understood that numerous additional modifications and variations could be made thereto without departing from the scope of the invention.

For the sake of clarity, it is to be understood that the use of 'a' or 'an' throughout this application does not exclude a plurality, and 'comprising' does not exclude other steps or elements.

The invention claimed is:

1. A bearing arrangement for a wind turbine, comprising:
    a first portion;
    a second portion;
    a sound wave sensor which is configured to detect a thickness of the second portion,
        wherein one of the first portion and the second portion is movable relative to the other of the first portion and the second portion; and
    a lubricating film which is arranged between the first portion and the second portion, and which is configured to lubricate a movement between the first portion and the second portion;
    wherein the sound wave sensor is configured to detect the thickness of the second portion through the first portion and the lubricating film.

2. The bearing arrangement according to claim 1, wherein the sound wave sensor is rigidly connected to the first portion.

3. The bearing arrangement according claim 2, wherein the sound wave sensor is glued to the first portion.

4. The bearing arrangement according to claim 1, wherein the first portion comprises steel material.

5. The bearing arrangement according to claim 1, wherein the sound wave sensor is configured to detect the thickness of the second portion during a movement of one of the first portion and the second portion relative to the other of the first portion and the second portion.

6. The bearing arrangement according to claim 1, wherein the second portion is a sliding pad.

7. The bearing arrangement according to claim 6, further comprising a plurality of sliding pads arranged circularly around the first portion, wherein the plurality of sliding pads is configured to rotate around the first portion.

8. The bearing arrangement according to claim 7, wherein the sound wave sensor is configured to detect thicknesses of at least two sliding pads of the plurality of sliding pads.

9. The bearing arrangement according to claim 1, further comprising a further sound wave sensor which is configured to detect a further thickness of the second portion.

10. A wind turbine comprising a bearing arrangement according to claim 1.

11. The wind turbine according to claim 10, further comprising a hub and a blade which is rotatably connected to the hub by means of the bearing arrangement.

12. The wind turbine according to claim 11, wherein the first portion is fixedly connected to one of the hub and the blade and the second portion is fixedly connected to the other of the hub and the blade.

\* \* \* \* \*